United States Patent
Radinger et al.

(10) Patent No.: US 8,646,982 B2
(45) Date of Patent: Feb. 11, 2014

(54) ROLLING BEARING

(75) Inventors: Norbert Radinger, Nuremberg (DE); Tomas Smetana, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 78 days.

(21) Appl. No.: 13/390,396

(22) PCT Filed: Jul. 21, 2010

(86) PCT No.: PCT/EP2010/060525
§ 371 (c)(1),
(2), (4) Date: Feb. 14, 2012

(87) PCT Pub. No.: WO2011/018314
PCT Pub. Date: Feb. 17, 2011

(65) Prior Publication Data
US 2012/0141058 A1    Jun. 7, 2012

(30) Foreign Application Priority Data

Aug. 14, 2009 (DE) .......................... 10 2009 037 571

(51) Int. Cl.
*F16C 19/55* (2006.01)

(52) U.S. Cl.
USPC ............................................................ 384/461

(58) Field of Classification Search
USPC ................................................ 384/461, 516
See application file for complete search history.

(56) References Cited

U.S. PATENT DOCUMENTS

| | | | | |
|---|---|---|---|---|
| 3,011,364 A * | 12/1961 | Mims | ............................ | 384/461 |
| 3,597,029 A * | 8/1971 | Marcum | ........................ | 384/461 |
| 3,737,202 A | 6/1973 | Rosales | | |
| 4,045,100 A * | 8/1977 | Beauchet | ...................... | 384/461 |
| 5,820,272 A * | 10/1998 | Nashiki et al. | ................ | 384/461 |
| 6,443,624 B1 | 9/2002 | Knepper | | |
| 2008/0232731 A1* | 9/2008 | Venter | ........................... | 384/517 |
| 2009/0081040 A1* | 3/2009 | Ueno et al. | ..................... | 384/461 |

FOREIGN PATENT DOCUMENTS

| | | |
|---|---|---|
| CN | 101415961 A | 4/2009 |
| DE | 103 14 259 A1 | 10/2004 |
| GB | 835421 A | 5/1960 |
| JP | 2008138842 A | 6/2008 |

\* cited by examiner

*Primary Examiner* — Thomas R Hannon
(74) *Attorney, Agent, or Firm* — Lucas & Mercanti, LLP

(57) ABSTRACT

A rolling bearing that has at least one first row of rolling elements and one second row of rolling elements as well as a common bearing ring for both rows.

14 Claims, 3 Drawing Sheets

ROLLING BEARING

CROSS-REFERENCE TO RELATED APPLICATIONS

This application is a 371 of PCT/EP2010/060525 filed Jul. 21, 2010, which in turn claims the priority of DE 10 2009 037 571.6 filed Aug. 14, 2009. The priority of both applications is hereby claimed and both applications are incorporated by reference herein.

FIELD OF THE INVENTION

The invention concerns a rolling bearing comprising at least one first row and one second row of rolling elements and a common bearing ring for both of first and second rows.
    said bearing ring comprising a radially outer raceway for the rolling elements of the first row and a radially inner raceway for the rolling elements of the second row,
    the rolling elements in each of the first and the second row being in osculating contact with an inner raceway and an outer raceway,
    the contours of the raceways in imaginary sectional planes that extend axially along the axis of rotation and are disposed at the contact of the respective raceway and the respective rolling element are defined by at least one raceway radius oriented in the respective sectional plane,
    the contours of the rolling elements, at least in the imaginary planes, being rotationally symmetrical to a respective center of rotation of the rolling elements while being defined by at least one rolling element radius starting from the center of rotation, and
    as viewed from the center of rotation, the contours of the rolling elements and of the raceways in the respective sectional planes being convexly vaulted in identical directions,
wherein the rolling elements of the first row and the rolling elements of the second row have the same rolling element radius.

BACKGROUND OF THE INVENTION

U.S. Pat. No. 3,737,202 shows three embodiments of generic rolling bearings. The load bearing balls disposed within a respective row are equal in size to one another and to the balls of other rows, i.e. they all have the same rolling element radius. The first embodiment shows rolling bearings of the double row angular contact ball bearing type. The second and third embodiments show mixed types of angular contact ball bearings and radial deep groove ball bearings.

The first embodiment of the generic ball bearing comprises two rows of balls with an inner bearing ring for the first row of balls, a common bearing ring for the first row and the second row as also at least one outer bearing ring for the second row. The common bearing ring comprises an outer raceway for the balls of the radially inner first continuous row and an inner raceway for the balls of the radially outer second continuous row.

U.S. Pat. No. 3,737,202 describes two groups of the pre-cited embodiments. In the first group, the pitch circles of the first row and the second row have the same pitch circle diameter. Because the rows have identical pitch circles and the balls all have the same diameter, the diameters of the inner osculating circles of the rows are equal to each other and the diameters of the outer osculating circles of the rows are equal to each other.

In the second group of the pre-cited embodiments of double row ball bearings, the first row of balls has a pitch circle whose pitch circle diameter is smaller than the pitch circle diameter of the pitch circle of the second row. Because the balls all have identical diameters but different pitch circles, the diameters of the inner osculating circles of the rows are also different from each other and the diameters of the outer osculating circles of the rows are likewise different from each other.

Osculating circles are the circles around the axis of rotation of the rolling bearing on which the contacts of the balls with the raceways are situated.

The second embodiment of the generic ball bearing of U.S. Pat. No. 3,737,202 comprises three rows of balls, one common bearing ring for the rows as also inner bearing rings and outer bearing rings. These triple row ball bearings can be divided into groups as described below.

The triple row ball bearings of the first group comprise a first row and two second rows of baits as well as a common bearing ring for the first row and the second rows. The balls of the first row are arranged on a pitch circle that is smaller than the pitch circle on which the balls of both the second rows are arranged. The pitch circles of the two second rows are equal in size to each other. The balls of the first row run on an outer raceway of the common bearing ring and on an inner raceway of an inner ring. The common bearing ring further comprises two inner raceways for the two second rows. The ball bearing further comprises two separate outer bearing rings each of which comprises an outer raceway for one of the two rows.

The triple row ball bearings of the second group according to U.S. Pat. No. 3,737,202 comprise two first rows of balls whose pitch circles are of equal size to each other, and one second row of balls as well as a common bearing ring for the rows. The pitch circle diameters of the pitch circles of the first rows are smaller than the diameter of the pitch circle of the one second row. Each of the outer raceways for the two first rows is arranged on the common bearing ring. The inner raceways for the two first rows are arranged on a respective inner bearing ring per row. The common bearing ring further comprises an inner raceway for the balls of the second row. Further, to the balls of the second row is likewise associated an outer raceway on an outer bearing ring.

The third embodiment describes a ball bearing with two first rows and one second row. The balls of the three rows are arranged on axially adjacent pitch circles of identical diameters and comprise a common bearing ring. The common bearing ring comprises two outer raceways for the first rows and one inner raceway for the second row. In addition, an inner bearing ring is associated to each of the first rows and an outer bearing ring is associated to the second row.

According to U.S. Pat. No. 3,737,202, advantages of these embodiments are the total rotational speed of the bearing is reduced to approximately half the total rotational speed on each of the rows so that the durability of the rolling bearing is enhanced. Given the case that friction increases in the rolling contact of one of the rows due to wear or heat, its speed of rotation is reduced to an acceptable level and the rotational speed difference is equalized by the other row. In the case that one row fails completely, the bearing still possesses emergency running abilities in the sense that, although the other bearing continues to rotate at the total rotational speed, the roiling bearing itself is not blocked at once.

DE 103 14 259 A1 shows an example of a double row angular contact ball bearing of a generic type in which the two rows have a common bearing ring and different pitch circles. It is known from DE 103 14 259 A1 that, through the use of a common bearing ring, the total rotational speed of the balls of the rows can be substantially halved so that the diameter-rotational speed-characteristic value can likewise be substantially halved.

This characteristic value is also designated as rotational speed characteristic value in the description of technical basics in the Chapter "Lubrication" of the Catalogue HR1 of Schaeffler K G, issued January 2006, and is the product out of rotational speed and pitch circle diameter and is further dependent on the bearing type. This characteristic value is a value that is taken into consideration for the choice of the lubricant grease depending on load and rotational speed conditions. Depending on the bearing type, the limit values for this characteristic value are situated between 350,000 and 600,000. The value is of importance for the durability of the lubricant grease and therefore, also, for the durability of the rolling bearing.

Among other things, the friction within a rolling bearing also depends on the load, the temperatures, the rotational speed and the viscosity of the lubricant grease. In the textbook "Walziagerpraxis" Brändlein, Eschmann, et al, published by Vereinigte Fachbuchverlage GmbH, 1995 Edition, it can be read in the Chapter "Reibung, Ternperatur and Schmierung" on page 210: "The resistance with which a rolling bearing opposes its rotation is made up of rolling friction, sliding friction and lubricant friction." To be read further is: "The importance of the friction results from the fact that it determines the heat produced in the bearing and thus influences the temperature of the hearing components and of the lubricant". On page 213 of the same chapter it is stated: "The lubricant friction in a bearing is made up of the internal friction of the lubricant at the contact points and the splashing and flexing work resulting from superfluous lubricant and higher speeds of rotation. The total lubricant friction depends in the first place on the quantity and viscosity of the lubricant. At lower speeds of rotation, this friction is generally low. However, it increases clearly as a function of the oil viscosity or grease consistency with increasing speed of rotation."

The rule of thumb for grease-lubricated rolling bearings is therefore: In bearings with higher operational speeds of rotation, use lubricating greases with lower consistencies. Besides this, as a rule, due to the requirements made of them, these lubricating greases are substantially more expensive than lubricating greases that can be used in bearings with lower speeds of rotation. In addition, with increasing speeds of rotation and, therefore, increasing influence of centrifugal force and/or at higher temperatures, it is more difficult to keep the lubricating grease in the rolling contact areas and in the rolling bearing due to the relatively low consistence of the lubricating grease. For this reason, specially configured cages and complex seals are often required in such bearings, and this also makes the rolling bearings more expensive.

In all rolling bearings with curved raceway and rolling element profiles, the radius of the raceway profile is slightly larger than the corresponding radius of the rolling element. This difference of curvature in the axial plane is characterized by the osculation. By osculation is to be understood the groove oversize relative to the rolling element radius. ["Wälzlagerpraxis" Brändlein, Eschmann, et al., Vereinigte Fachbuchverlage GmbH, 1995 Edition]. The invention therefore concerns rolling bearings in which the radius of the raceways in the rolling contact areas is larger than the radius of the rolling elements at these points.

SUMMARY OF THE INVENTION

The invention broadly relates to a rolling bearing designed to reduce friction, improve durability, and which is also manufactured at low costs.

More specifically, the invention is directed to a rolling bearing which comprises at least one first row of rolling elements, at least one second row of rolling elements, a common bearing ring for both the first row of rolling elements and the second row of rolling elements, an outer bearing ring having an inner raceway, and an inner bearing ring having an outer raceway. The common bearing ring has a radially outer raceway for the rolling elements of the first row and a radially inner raceway for the rolling elements of the second row. The rolling elements in the first row are in osculating contact with the outer raceway of the common bearing ring and the outer raceway of the inner bearing ring. The rolling elements in the second row are in osculating contact with the inner raceway of the outer bearing ring and the inner raceway of the common bearing ring. The inner raceway of the outer bearing ring, the outer raceway of the inner bearing ring and the inner raceway and the outer raceway of the common bearing ring have contours in imaginary sectional planes extending axially along an axis of rotation of the rolling bearing defined by at least one raceway radius orientated in one of the sectional planes. The sectional planes are disposed at a contact of one of the raceways and one of the robing elements. The contours of the rolling elements, at least in the sectional planes, have a convex shape relative to a center of rotation of the rolling elements by at least one roiling element radius, as viewed from the center of rotation, the contours of the rolling elements and the raceways in the sectional planes are convexly curved in identical directions, and the rolling elements of the first row have a same rolling element radius as the rolling elements of the second row, The raceway radius either of the inner raceway or of the outer raceway of the first row is different from the raceway radius of the inner raceway on the common bearing ring. The common bearing ring is also designated as intermediate ring. The inner raceway is situated radially outside on the intermediate ring. Consequently, the inner raceway is that of the second row. Differently put, the osculation of the rolling elements of the first row with the curvature of the inner raceway or the outer raceway, as the case may be, is different from the osculation of rolling elements of the second row with the curvature of their inner raceway.

As already described in paragraph "Background of the invention," the friction determines the heat produced in the bearing and thus influences the temperature of the bearing components and of the lubricant. The friction in the bearing depends on the speed of rotation. The higher the speed of rotation, the higher is the friction. The friction leads to resistances against the rotation of the bearing that are also designated as friction torques. In rolling bearings of the prior art type therefore, different relative rotational speeds and thus also different friction torques are produced in rows having different pitch circles. Differences in the friction torques lead to non-uniform loading and to temperature differences in the bearings. The durability of the grease has therefore to be dimensioned according to the values of the row with the larger pitch circle diameter.

The advantage of the invention is that these non-uniform loads can be enhanced, reduced or equalized in a controlled manner through a different osculation at the rolling contact of the one row relative to the other row. Higher osculation reduces the friction in the bearing. Lower osculation increases the friction. Thus, through the choice of suitable osculation ratios, a controlled regulation of the rotational speed of the intermediate ring to exactly half is possible and not, as is the case in the generic prior art, only to approximately half of the total rotational speed.

Thus, it is also imaginable to increase the value of the osculation in the row of the rolling bearing that has the larger pitch circle compared to the osculation in the row with the smaller pitch circle. In this way, the higher fractional friction in the row with the larger pitch circle caused by the higher relative rotational speed can be re-compensated so that about the same friction conditions prevail in both rows. The rotational speed characteristic value can thus be calculated on the basis of exactly the speed of rotation of the intermediate ring which can be purposefully adjusted through the osculation value. The choice of less expensive lubricant grease is just as well imaginable as the prolongation of the durability of hitherto used grease.

It is further conceivable for the rows that are subjected to higher thermal load on one or on both raceways to have a higher osculation with the rolling elements than the raceways of the rows subjected to lower thermal loads. In this way, a higher fractional friction caused by higher thermal load in the rolling contact can be compensated by a higher osculation on the raceway concerned.

Besides this, the osculation on raceways of rows that are exposed in operation to other deformations than other raceways can be higher or lower than the oscillation on raceways with other deformations. Thus, the higher fractional friction caused by different deformation can be compensated in a controlled manner through the choice of a different osculation on the raceway concerned.

According to one embodiment of the invention, the raceway radius of the inner raceway of the first row on the inner bearing ring is smaller than the raceway radius of the inner raceway of the second row on the common bearing ring. Thus, the osculation of the rolling elements of the first row with the curvature of the outer raceway is lower than the osculation of the rolling elements of the second row with the curvature of the inner raceway on the intermediate ring.

According to another provision of the invention, the raceway radius of the outer raceway for the rolling elements of the first row on the common bearing ring is smaller than the raceway radius of the inner raceway for the second rolling elements on the common bearing ring. In this way, the osculation between the roiling elements of the first row and the curvature of the outer raceway on the intermediate ring is lower than the osculation between the curvature of the inner raceway on the intermediate ring and the rolling elements of the second row.

According to a further proposition of the invention, the raceway radius of the inner raceway on the common bearing ring is smaller than the raceway radius of the outer raceway of the second row. In this way, the osculation between the rolling elements of the second row and the curvature of the inner raceway on the common bearing ring is lower than the osculation between the rolling elements of the second row and the curvature of the outer raceway.

In a further development of the invention, the raceway radius of the inner raceway of the first row is smaller than the raceway radius of the outer raceway for the first row on the common bearing ring. According to a further proposition in this connection, the raceway radius of the outer raceway for the first row on the common bearing ring is smaller than the raceway radius of the inner raceway for the second row on the common bearing ring, and the raceway radius of the inner raceway for the second row on the common bearing ring is smaller than the raceway radius of the outer raceway for the second row. In other words, the osculation of the rolling elements of each row with its outer raceways is higher than the osculation of the rolling elements of the same row with the curvatures of the respective inner raceway. At the same time, the osculation between the rolling elements of the first row and the curvatures of its raceways is lower than the osculation between the roiling elements of the second row and the curvatures of its raceways.

These osculation ratios are particularly preferred in the case of double row angular contact ball bearings with a common bearing ring as intermediate ring. The invention further concerns all design variants groups of rolling bearings which have been mentioned in the paragraph "Background of the invention."

The first rows differ from the second rows through the diameter of their pitch circles and/or through the type of their bearing arrangement, the number of first rows and second rows in the rolling bearing not being of any importance. However, all first rows of a bearing have identical pitch circles and/or are of the same type of hearing. Accordingly, all second rows of a bearing also have their own identical pitch circles and/or are of the same type of bearing. It is also conceivable for the rolling bearing of the invention to have third, fourth and nth rows of rolling elements that differ from the rows with the other ordinal numbers through different pitch circles and/or other types of bearings. Thus, it is imaginable to combine in one single bearing arrangement, radial deep groove ball bearings with angular contact ball bearings and/or four point bearings. The invention also applies to rolling bearings in which all load-bearing rolling elements of the rows have identical diameters.

By a common bearing ring is to be understood a one-piece component or a component made up of any number of pieces with which at least two rows of rolling elements differing through their pitch circle or type are in rolling contact. This common bearing ring is arranged as an intermediate ring between these rows and therefore rotates at half the total rotational speed of the bearing.

Inner raceways are those raceways of a row that are closer to the axis of rotation than the outer raceway of the same row. The contours of the inner raceways are described about the axis of rotation through outer peripheries and the contours of the outer raceways through inner peripheries. These definitions of the raceways also permit the inner raceway(s) of a row to be described, as a whole or partially, through outer peripheries that are larger than the inner peripheries through which the outer raceways of one or more other rows are described. The raceways are configured on components that are either the classical rolling bearing rings or are configured directly on shafts, journals, housings and hollow cylindrical components of any type.

By angular bearings are to be understood those bearing arrangements in which the pressure lines between the contacts of the rolling elements on the inner raceway and on the outer raceways do not extend, as is the case in deep groove ball bearings, radially to the central axis of the bearing but at an inclination to this. The pressure line extends in an imaginary sectional plane which extends axially along the axis of rotation of the rolling bearing and is situated at the contact of the rolling elements with the respective raceway between the contacts of the rolling elements with the inner raceway and the outer raceway.

The rolling elements of the first row contact the inner raceway at a point of contact on an inner osculating circle extending about the axis of rotation. The diameter of this osculating circle is smaller than the diameter of an inner osculating circle extending about the axis of rotation at the point of contact of the rolling elements of the second row with the inner raceway on the bearing ring.

The osculating circles are the imaginary circles extending about the axis of rotation of the rolling bearing on respective raceways and are situated at the contacts of the respective row with the raceway. Here, a distinction is made between inner osculating circles on the inner raceway and outer osculating circles on the outer raceway. In cylindrical roller bearings and ball bearings, the osculating circles are defined by the respective contact of the nominal diameters of the rollers or balls. In radial bearings, the osculating circles are situated on the inner raceway in the same radial plane as the osculating circles on the outer raceways. In angular contact ball bearings, the osculating circles are situated in different radial planes axially adjacent to each other.

According to one development of the invention, both rows of the roller bearing are arranged in an angular contact ball bearing arrangement so that the rolling bearing is a double row angular contact ball bearing with a common intermediate ring. Further, the pressure lines of both the angular contact ball bearing rows enclose the same pressure angle with their common axis of rotation.

The angular contact ball bearing has a double-row configuration with a first row of balls, a second row of balls and the common bearing ring between the rows. The common bearing ring comprises the outer raceway for the halls of the first row and the inner raceway for the balls of the second row. The osculation between the balls of the first row and the curvature of one of the raceways of the first row is lower than the osculation of the balls of the second row with the curvature of at least one of the raceways of the second row.

The angular contact ball bearing comprises an inner bearing ring for the first row, the common bearing ring between the first row and the second row, and an outer bearing ring for the second row. The bearing rings are radially concentric to each other and are inter-inserted in axial direction at least partially so that the common bearing ring surrounds, at least partially, an axial section of the periphery of the inner ring and the outer bearing ring surrounds, at least partially, an axial section of the periphery of the common bearing ring.

The osculation between the rolling elements of the first row and the curvature of the inner raceway on the inner ring is preferably lower than the osculation between the rolling elements of the first row and the curvature of the outer raceway on the common bearing ring, in addition, the osculation between the rolling elements of the first row and the curvature of the outer raceway on the common bearing ring is lower than the osculation between the rolling elements of the second row and the inner raceway on the common bearing ring. Finally, the osculation between rolling elements of the second row and the curvature of the outer raceway on the outer ring is the highest in the angular contact ball bearing so that, as viewed in radial direction from the inside to the outside, the values of the osculation on the contacts in the rolling bearing increase from raceway to raceway.

Preferred osculation ratios result from the following relationships:

The value of the osculation $S_{i1}$ on the inner raceway of the inner bearing ring is $S_{i1}=103$ to max. 107, i.e. the radius of the curvature of the inner raceway is 3% to maximum 7% larger than the radius of the rolling elements.

The value of the osculation $S_{a1}$ on the outer raceway for the rolling elements of the first row on the common intermediate ring is always larger by the numerical value "two" than the osculation $S_{i1}$ so that $S_{a1}$ is situated in the range of $S_{a1}=105$ to maximum $S_{a1}=109$ which means that the outer raceway has radii of 5% to 9% larger than the rolling element radius, and a radius of 2% larger than the radius of the inner raceway in each case.

The osculation ratios thus obtained in the first row are $S_{i1}/S_{a1}=103/105$, alternatively 104/106, alternatively 105/107, alternatively, preferably 106/108 and alternatively 107/109.

The value of the osculation $S_{i2}$ on the inner raceway for the second row on the intermediate ring is always larger by the numerical value "two" than the osculation $S_{a1}$ so that $S_{i1}$ is situated in the range of $S_{i2}=107$ to maximum $S_{i2}=111$, which means that its radii are larger by 7% to 11% than the rolling element radius and larger by 2% than the radius of the outer raceway on the intermediate ring in each case.

The osculation ratios thus obtained between the outer raceway of the first row relative to the inner raceway of the second row are $S_{a1}/S_{i2}=105/107$, alternatively 106/108, alternatively 107/109, alternatively, preferably 108/110 und alternatively 109/111.

The value of the osculation $S_{a2}$ on the outer raceway for the rolling elements of the first row on the common intermediate ring is always larger by the numerical value "five" than the osculation $S_{i2}$ so that $S_{a2}$ is situated in the range of $S_{a2}=112$ to maximum $S_{a2}=116$, which means that the outer raceway has radii that are larger by 12% to 16% than the rolling element radius and a radius larger by 5% than the radius of the inner raceway on the intermediate ring in each case.

The osculation values thus obtained in the second row are $S_{i2}/S_{a2}=107/112$, alternatively 108/113, alternatively 109/114, alternatively, preferably 110/115 und alternatively 111/116.

By pitch circle is to be understood the imaginary circle about the axis of rotation that extends through the centers of rotation of the rolling elements arranged adjacent to one another in peripheral direction. These centers of rotation are situated on the axes of rotation of cylindrical rollers or are center points of balls.

Further examples of types of bearings in which the invention can be implemented are rolling bearings with rollers with a ball-convex surface such as in ball-roller bearings. The ball-roller bearing comprises rolling elements in the form of ball-rollers which are also called ball-disks. A ball-roller is a roller whose rotationally symmetrical peripheral surfaces are described by a ball radius which starts from the center of the ball-roller. The ball-rollers comprise flattened flanks which deviate from the basic ball shape. The flanks shaped with a circular surface are concentric to the axis of rotation of the ball-rollers and thus arranged parallel to one another so that they are perpendicularly crossed by the axis of rotation. The advantage of the use of such rolling elements is that, with a dimension comparable to groove ball bearings, a larger number of rolling elements can be filled into the bearings which, in spite of this, are lighter than classical ball bearings.

Further examples of types of bearings in which the invention can be implemented are cylindrical roller bearings whose rollers comprise a convexly vaulted surface which is rotationally symmetrical to its own axis of rotation. In axial sections along the axis of rotation of the rollers, the contour of the surface is described by one or more radii whose points of emanation are situated at any desired distance from the axis of rotation of the roller or on the axis of rotation. In the latter case, however, these radii are larger than the largest radial diameter of the roller.

The invention concerns the species of multi-row rolling bearings in which the number of bearing rings is larger, small or equal to the number of the rolling element rows.

A generally known measure for reducing the peripheral speed is the reduction of the diameter of the pitch circle. The smaller the pitch circle, the lower are the peripheral speeds and, thus also, the friction and the self-warming of the bearing. However, the pitch circle cannot be reduced by any random amount because the necessary basic load rating can then no longer be achieved. Such measures are also limited through the dimensions of the surrounding structure. This is particularly true for inter-inserted arrangements in double clutch transmissions and their clutches.

A further independent claim therefore proposes for a transmission shaft arrangement of a transmission, particularly of a double clutch transmission, a bearing arrangement for mounting at least one transmission shaft. The bearing arrangement comprises at least one pre-stressed double row angular contact ball hearing comprising at least one first row of balls, at least one second row of balls and one common bearing ring between these rows. The common bearing ring comprises, as already described, an outer raceway for the balls of the first row and an inner raceway for the balls of the second row. According to the above described subject matter and its developments, the osculation between the balls of the first row and the curvature of at least one of the raceways of the first rows is lower than the osculation of the balls of the second row with the curvatures of the raceways for the second row.

A further independent claim proposes for a rolling bearing arrangement in a clutch of a double clutch transmission, at least one angular contact ball bearing of the invention. The angular contact ball bearing can be a support bearing or at least a release bearing. The angular contact bearing is double-rowed with a first row of balls and a second row of balls and a common bearing ring between the rows. The common bearing ring comprises an outer raceway for the halls of the first row and an inner raceway for the balls of the second row. The osculation between the balls of the first row and at least the curvature of one of the raceways of the first row is lower than the osculation of the balls of the second row with the curvatures of at least one of the raceways for the second row.

According to one embodiment of the invention, the bearing rings are radially concentric to one another and axially at least partially inter-inserted into one another so that the common bearing ring surrounds at least one axial section of the periphery of the inner ring, and the outer bearing ring surrounds at least one axial section of the periphery of the common bearing ring.

According to one embodiment of the invention, and with a view to already described ratios and relations as well as specific numerical values, the osculation between the rolling elements of the first row and the curvature of the inner raceway on the inner ring is lower than the osculation between the rolling elements of the first row and the curvature of the outer raceway on the common bearing ring. The osculation between the rolling elements of the first row and the curvature of the outer raceway on the common bearing ring is lower than the osculation between the rolling elements of the second row and of the inner raceway on the common bearing ring. The osculation between the rolling elements of the second row and the curvature of the outer raceway on the outer ring is the highest in the entire angular contact ball bearing.

BRIEF DESCRIPTION OF THE DRAWINGS

The present invention will be further understood and appreciated by reading the following description in conjunction with the accompanying drawings, in which.

DETAILED DESCRIPTION OF THE DRAWING INVENTION

Figure 1:
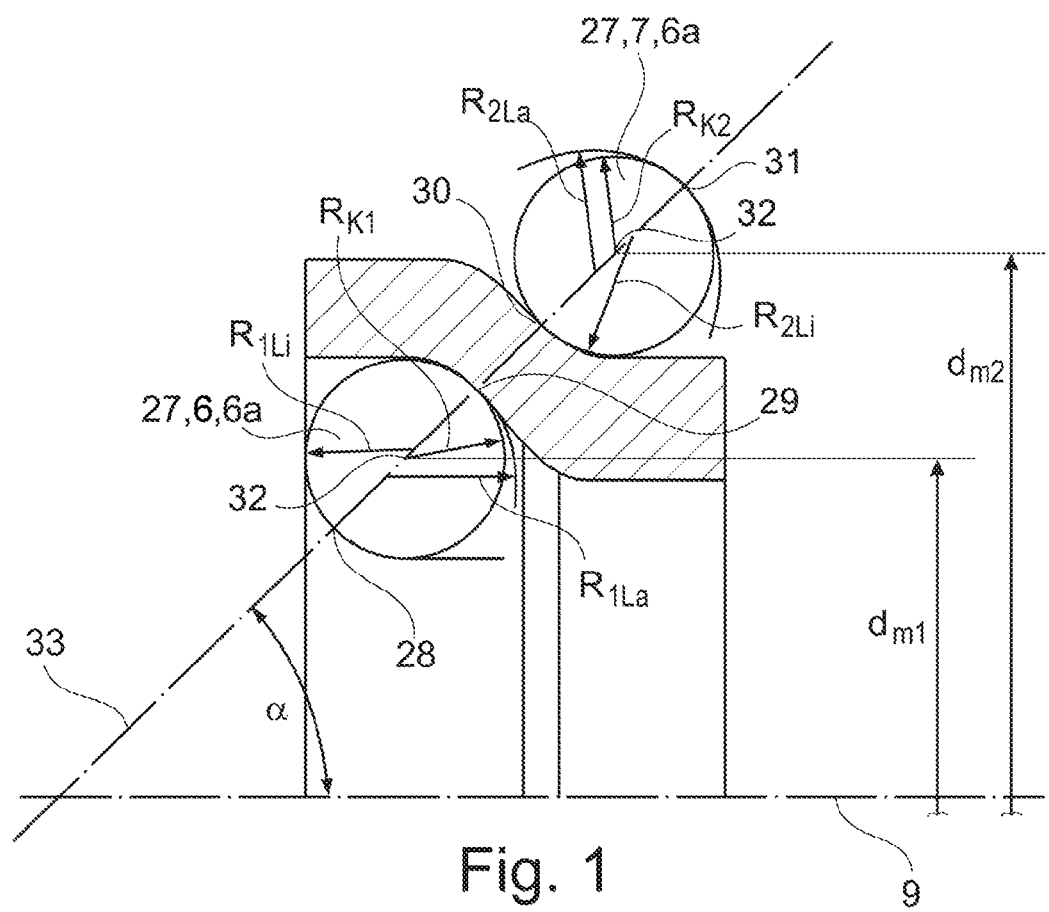
FIG. 1 is cross-sectional view of two rows of rolling elements and a common bearing ring of the present invention.

Equivalent functional elements, despite possibly different appearances, have been given the same reference numerals throughout the following description.

Figure 4:
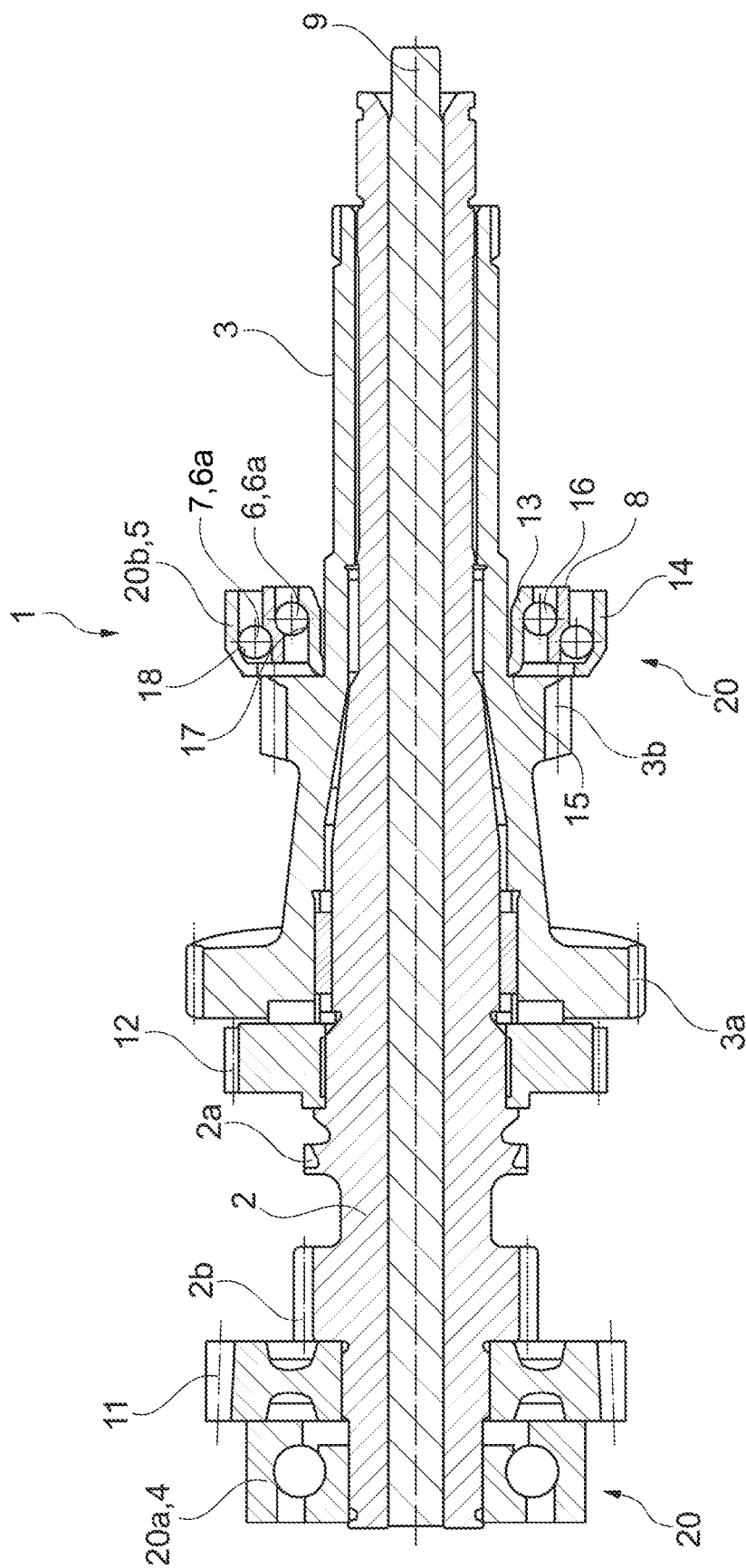
FIG. 4 is a cross-sectional view of a transmission shaft arrangement for a transmission.

FIG. 4—FIG. 4 shows a transmission shaft arrangement 1 for a transmission, not further illustrated, with two transmission shafts 2 and 3 that are mounted through a pre-stressed bearing arrangement 20. The bearing arrangement 20 comprises a rolling bearing 20a in the form of an angular contact ball bearing 4 and a rolling bearing 20b in the form of a double row angular contact bearing 5. The angular contact bearing 5 is double-rowed with at least one first row 6 of balls 6a and at least one second row 7 of balls 6a as well as a common bearing ring 8 between the rows.

The transmission shaft 2, which is partially inserted into the transmission shaft 3, comprises gearwheels 2a, 2b, 11 and 12 and is mounted for rotation relative to this about the axis of rotation 9. The transmission shaft 3 comprises the gearwheels 3a and 3b.

The rolling bearing 20a in FIG. 4 is single-roved but can also be configured alternatively as a double-row angular contact bearing 5. The angular contact bearing 5 comprises an inner bearing ring 13, an outer bearing ring 14 and a common bearing ring 8. The latter can also be designated as an intermediate ring. The inner bearing ring 13 comprises an inner raceway 15.

The common bearing ring 8 comprises, on a radially inner side, an outer raceway 16 for the row 6 and, on a radially outer side, an inner raceway 17 for the row 7. A radially inward facing outer raceway 18 is configured on the outer bearing ring 14. The bearing rings 8, 13 and 14 are arranged concentrically to the axis of rotation 9 and are partially inserted into one another.

Figure 2:
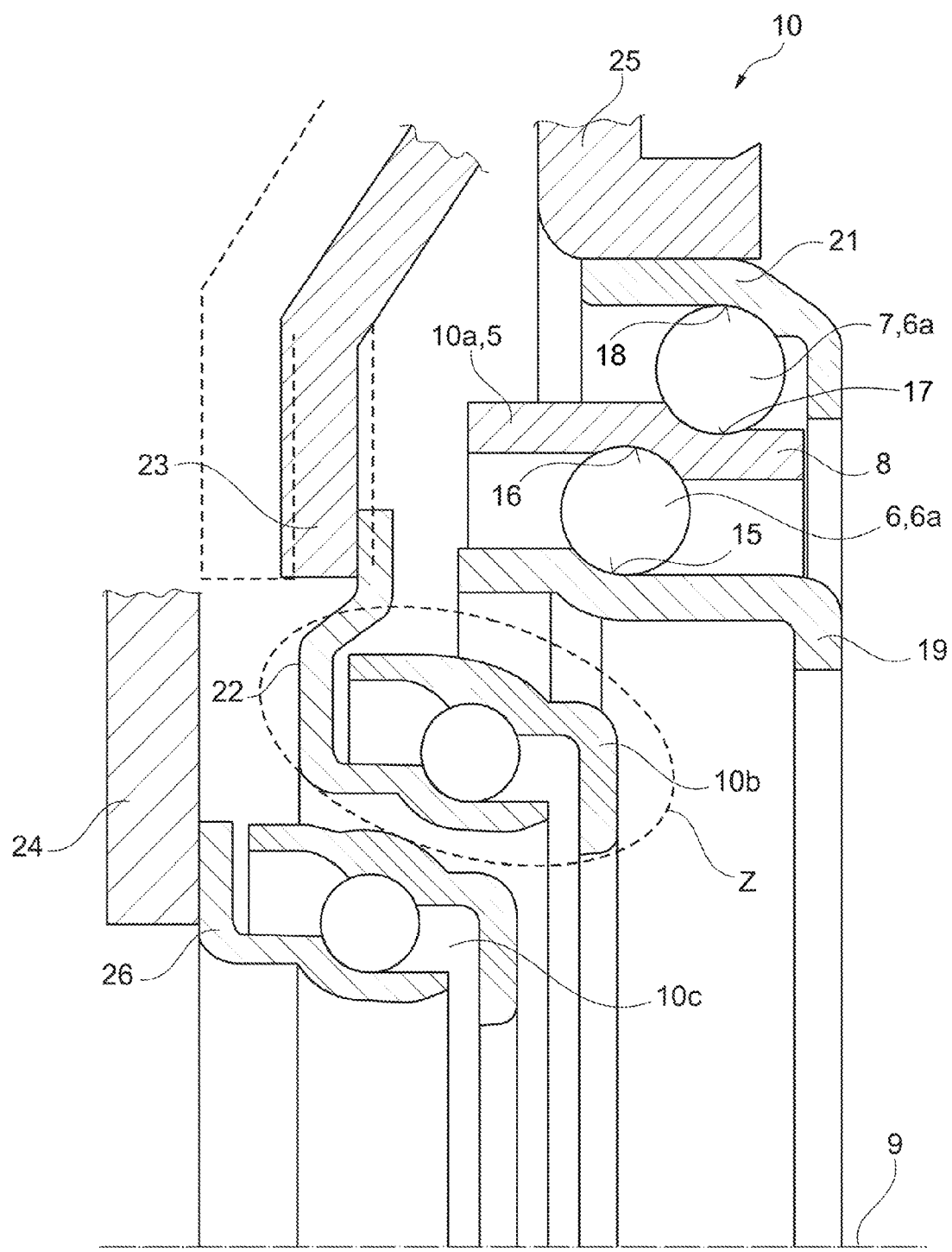
FIG. 2 cross-sectional view of a clutch arrangement of a clutch of a double clutch transmission.

FIG. 2—FIG. 2 shows a section out of a clutch arrangement of a clutch, not further illustrated, of a double clutch transmission, not further illustrated. The rolling bearing arrangement 10 shown in this figure comprises a rolling bearing 10a in the form of a double row angular contact bearing 5 comprising at least one first row 6 of balls 6a and at least one second row 7 of balls 6a as well as a common bearing ring 8, the common bearing ring 6 being arranged between the rows.

The rolling bearing arrangement 10 also comprises further rolling bearings 10b and 10c in the form of angular contact bearings which, as clutch release bearings are single-rowed but can also be configured as double-rowed bearings within the scope of the invention.

The rolling bearings 10b and 10c comprise pressure flanges 22 and 26 respectively. Each of the pressure flanges 22 bears against spring ends 23 and 24 respectively of a respective pressure spring of the clutch, only one of which has been illustrated in each case by way of example. The rolling bearing 10a is a support bearing that is seated in a clutch cover 25 which rotates about the axis of rotation 9.

The rolling bearing 10a comprises an inner bearing ring 19 and an outer bearing ring 21 as well as the common bearing ring 8 configured as an intermediate ring. On the inner bearing ring 19 is configured the inner raceway 15 and on the common ring, the outer raceway 16 for the first row 6. Besides this, the common bearing ring 8 is configured on a radially outer side with an inner raceway 17 for the second row 7 which is situated radially opposite the outer raceway 18 on the outer bearing ring 21. The bearing rings 8, 19 and 21 are inserted partially into one another and arranged concentrically to the axis of rotation 9.

Figure 3:
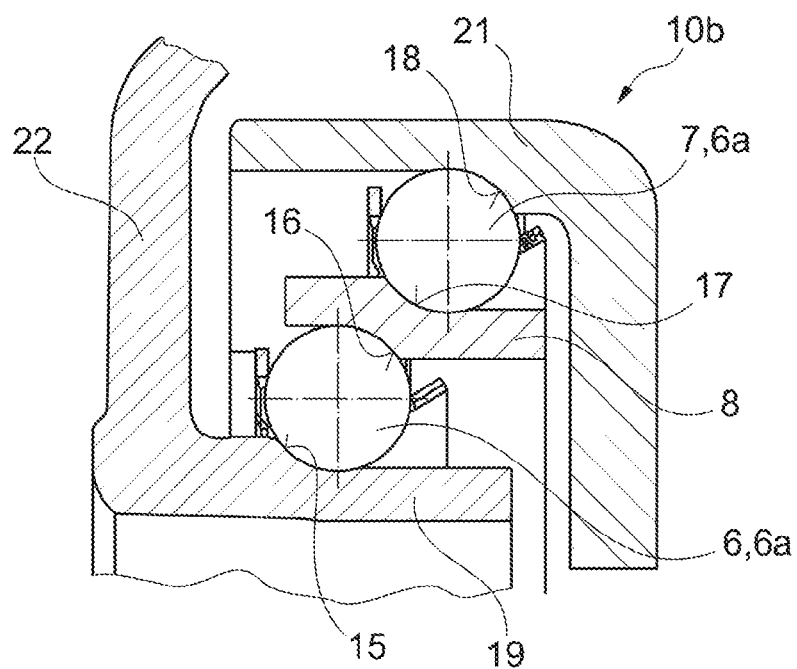
FIG. 3 is a cross-sectional view of Detail Z from FIG. 2.

FIG. 3—It is also imaginable to configure at least the rolling bearing 10b alternatively, as shown in the detail Z of FIG. 2, as a double row bearing with the row 6 of balls 6a, the common bearing ring 8 and the row 7 of balls 6a. In this case, the rolling bearing 10b comprises an inner bearing ring 19 and an outer bearing ring 21 as also the common bearing ring 8 configured as an intermediate ring. On the inner bearing ring 19 is configured the inner raceway 15 and on the common bearing ring 8, the outer raceway 16 for the first row 6. Besides this, the common bearing ring 8 is configured on a radially outer side with an inner raceway 17 for the second row 7 which is situated radially opposite the outer raceway 18 on the outer bearing ring 21.

FIG. 1—The rolling bearings 10a, 10b and 20b comprise a first row 6 and a second row 7 of rolling elements 27 in the form of balls 6a as also a common bearing ring 8 for both rows 6 and 7. FIG. 1 shows a detail of each of the rolling bearings 10a, 10b and 20b in an imaginary sectional plane extending axially along the axis of rotation 9, which sectional plane has been chosen at random out of a number of further possible sectional planes. The number of possible sectional planes corresponds to the number of rolling elements 27 per row 6 or 7.

The sectional planes are situated on the contacts 28, 29, 30 and 31 through the raceways 15, 16, 17 and 18 through the respective center point 32 of the rolling elements 27. Because the rolling elements 27 are balls 6a, the contacts 28, 29, 30 and 31 in the non-loaded state are almost point contacts. In the illustration of FIG. 1, the contacts 28, 29, 30 and 31 and the centers of rotation, i.e. the center points 32 of the rolling elements 27 are situated ideally on a common pressure line 33. The center points 32 of the balls 6a of the first row 6 are situated on a common pitch circle with the pitch circle diameter $d_{m1}$ and the center points 32 of the balls 6a of the second row 7 are situated on the pitch circle with the pitch circle diameter $d_{m2}$.

During operation of the rolling bearings 10a, 10b and 20b, the rolling elements 27 roll on their respective raceways 15, 16, 17 and 18 with different speeds so that the position of the center points 32 and, thus also, of the contacts 28 and 29 of the balls 6a of the row 6 relative to the center points 32 and the contacts 30 and 31 of the row 7 is rather a random position so that these center points 32 are rarely situated on a common pressure line. Therefore, it is not a must for a randomly chosen sectional plane that extends through the center point 32 of at least any one ball 6a out of any one of the rows 6 or 7 to also intersect other balls 6a at the center point 32. However, all the pressure lines 33 are inclined at the same angle of inclination $\alpha$ to the axis of rotation 9.

The bearing ring 8 comprises a radially outer raceway 16 for the rolling elements 27 in the form of balls 6a of the first row 6. Besides this, the bearing ring 8 also comprises an inner raceway 17 for the balls 6a of the second row 7. The balls of both the rows 6 and 7 have the same diameter so that the radii $R_{K1}$ and $R_{K2}$ of the balls are likewise equal to each other. The rolling elements 27 of the row 6 are in osculating contact with the inner raceway 15 and the outer raceway 16. The rolling elements 27 of the row 7 are in osculating contact with the inner raceway 17 and an outer raceway 18.

The contour of the inner raceway 15 in the respective sectional plane at the contact 28 is defined by the raceway radius $R_{1Li}$. The outer raceway 16 on the common bearing ring 8 has the raceway radius $R_{1La}$. The inner raceway 17 of the second row 7 has the radius $R_{2Li}$ in the contact 30 and the raceway 18 has the radius $R_{2La}$ in the contact 31 with the balls 6a.

Because the contours of the balls are described by the radius $R_{K1}$, the contours of the rolling elements 27 and the contours of the raceways 15, 16, 17 and 18 in the respective sectional planes, as viewed from the center of rotation 32, are convexly vaulted in the same direction.

According to the invention, the ball radius $R_{K1}=R_{K2}<R_{1Li}<R_{1La}<R_{2Li}<R_{2La}$ and at least one raceway radius $R_{1Li}$ or $R_{1La}$ is $<R_{2Li}$. Besides this, $R_{1Li}$ is $<R_{2Li}$. Further, $R_{1La}$ is $<R_{2Li}$. In addition, $R_{2Li}$ is $<R_{2La}$ and $R_{1Li}$ is $<R_{2La}$, so that $R_{K1}=R_{K2}<R_{1Li}<R_{1La}<R_{2Li}<R_{2La}$.

REFERENCE NUMERALS

1 Transmission Shaft Arrangement
2 Transmission Shaft
2a Gearwheel
2b Gearwheel
3 Transmission Shaft
3a Gearwheel
3b Gearwheel
4 Angular Contact Ball Bearing
5 Double Row Angular Contact Ball Bearing
6 First Row
6a Bail
7 Second Row
8 Common Bearing Ring
9 Axis of Rotation
10 Rolling Bearing Arrangement
10a Rolling Bearing
10b Rolling Bearing
10c Rolling Bearing
11 Gearwheel
12 Gearwheel
13 Inner Bearing Ring
14 Outer Bearing Ring
15 Inner Raceway
16 Outer Raceway
17 inner Raceway
18 Outer Raceway
19 inner Bearing Ring
20 Bearing Arrangement
20a Rolling Bearing
20b Rolling Bearing
20c Rolling bearing
21 Outer Bearing Ring
22 Pressure Flange
23 Spring End
24 Spring End
25 Clutch Cover
26 Pressure Flange
27 Rolling Element
28 Contact
29 Contact
30 Contact
31 Contact
32 Center Point
33 Pressure Line

The invention claimed is:
1. A rolling bearing, comprising:
at least one first row of rolling elements;
at least one second row of rolling elements;

a common bearing ring for both the first row of rolling elements and the second row of rolling elements, the common bearing ring comprising an outer raceway for the rolling elements of the first row and an inner raceway for the rolling elements of the second row;

an outer bearing ring forming an outer raceway for the second row of rolling elements; and an inner bearing ring forming an inner raceway for the first row of rolling elements, the rolling elements in the first row being in osculating contact with the outer raceway of the common bearing ring and the inner raceway of the inner bearing ring, the rolling elements in the second row being in osculating contact with the outer raceway of the outer bearing ring and the inner raceway of the common bearing ring, the outer raceway formed by the outer bearing ring, the inner raceway formed by the inner bearing ring and the inner raceway and the outer raceway of the common bearing ring have contours in imaginary sectional planes extending axially along an axis of rotation of the rolling bearing defined by at least one raceway radius orientated in a respective sectional plane, the sectional planes being disposed at a contact of one of the respective raceway and the respective rolling elements, the roiling elements having contours, at least in the sectional planes, have a convex shape relative to a center of rotation of the rolling elements by at least one rolling element radius, as viewed from the center of rotation, the contours of the rolling elements and the raceways in the respective sectional planes are convexly curved in identical directions, and the rolling elements of the first row have a rolling element radius equal to the radius of the rolling elements of the second row, wherein the raceway radius of one of the raceways for the first row of rolling elements is different from the raceway radius of the inner raceway on the common bearing ring.

2. The rolling bearing according to claim 1, wherein the raceway radius of the inner raceway of the first row is smaller than the raceway radius of the inner raceway of the second row.

3. The rolling bearing according to claim 1, wherein the raceway radius of the outer raceway for the first row of rolling elements on the common bearing ring is smaller than the raceway radius of the inner raceway on the common bearing ring.

4. The roiling bearing according to claim 1, wherein the raceway radius of the inner raceway on the common bearing ring is smaller than the raceway radius of the outer raceway of the second row of rolling elements.

5. The rolling bearing according to claim 1, wherein the raceway radius of the inner raceway of the first row of rolling elements is smaller than the raceway radius of the outer raceway on the common bearing ring.

6. The rolling bearing according to claim 5, wherein the raceway radius of the outer raceway on the common bearing ring for the first row of rolling elements is smaller than the raceway radius of the inner raceway on the common bearing ring for the second row of rolling elements, and the inner raceway radius on the common bearing ring is smaller than the of raceway radius of the outer raceway for the second row of rolling elements.

7. The rolling bearing according to claim 1, wherein the roiling element radius has a point of emanation at the center of rotation of the rolling elements.

8. The roiling bearing according to claim 7, wherein the rolling elements are balls.

9. The rolling bearing according to claim 8, wherein both the first row of rolling elements and the second row of rolling elements are arranged in an angular contact ball bearing arrangement.

10. The rolling bearing according to claim 1, wherein both the first row of rolling elements and the second row of rolling elements have pressure lines that are inclined relative to the axis of rotation of the roiling bodies with an angle of inclination, and both the first row of rolling elements and the second row of rolling elements are inclined with equally large angles of inclination relative to the axis of rotation.

11. A transmission shaft arrangement for a transmission, comprising:

at least one transmission shaft mounted through a pre-stressed rolling bearing arrangement, wherein at least one rolling bearing of the rolling bearing arrangement is formed by at least one double row angular contact ball bearing comprising at least one first row of balls and at least one second row of balls, an outer bearing ring having an outer raceway for the balls of the second row, an inner bearing ring having an inner raceway for the balls of the first row, and a common bearing ring arranged between the rows, the common bearing ring having an outer raceway for the balls of the first row and an inner raceway for the balls of the second row, and wherein an osculation between the balls of the first row and at least a curvature of one of the raceways for the first row is lower than an osculation of the balls of the second row with curvatures of at least one of the raceways for the second row.

12. A rolling bearing arrangement in at least one clutch of a double clutch transmission, comprising:

at least one angular contact ball bearing, wherein the angular contact bearing is double-rowed and comprises at least one first row of balls and at least one second row of balls, an outer bearing ring having an outer raceway for the balls of the second row, an inner bearing ring having an inner raceway for the balls of the first row, and a common bearing ring arranged between the rows, the common bearing ring having an outer raceway for the balls of the first row and an inner raceway for the balls of the second row, and wherein an osculation between the balls of the first row and at least the curvature of one of the raceways of the first row is lower than an osculation of the balls of the second row with the curvatures of at least one of the raceways for the second row.

13. The rolling bearing arrangement according to claim 12, wherein the angular contact ball bearing comprises an inner bearing ring for the first row, the common bearing ring arranged between a first row and a second row, and an outer bearing ring for the second row, the bearing rings are arranged radially concentric to one another and axially inter-inserted at least partially into one another so that the common bearing ring surrounds at least one axial section of a periphery of the inner bearing ring and the outer bearing ring surrounds at least one axial section of the periphery of the common bearing ring.

14. The rolling bearing arrangement according to claim 13, wherein the osculation between the rolling elements of the first row and a curvature of the inner raceway on the inner bearing ring is lower than the osculation between the rolling elements of the first row and a curvature of the outer raceway on the common bearing ring, the osculation between the rolling elements of the first row and the curvature of the outer raceway on the common bearing ring is lower than the osculation between the rolling elements of the second row and the inner raceway on the common bearing ring, the osculation between the rolling elements of the second row and the curvature of the outer raceway on the outer ring being the highest in the angular contact ball bearing.

* * * * *